United States Patent
Cremer et al.

(10) Patent No.: US 6,424,421 B1
(45) Date of Patent: Jul. 23, 2002

(54) METHOD AND DEVICES FOR MEASURING DISTANCES BETWEEN OBJECT STRUCTURES

(75) Inventors: Christoph Cremer, Heidelberg; Michael Hausmann, Ludwigshafen; Joachim Bradl, Schriesheim; Bernd Rinke, Kirkel, all of (DE)

(73) Assignee: Ruprecht-Karls-Universität Heidelberg, Heidelberg (DE)

( * ) Notice: Subject to any disclaimer, the term of this patent is extended or adjusted under 35 U.S.C. 154(b) by 0 days.

(21) Appl. No.: 09/331,644
(22) PCT Filed: Dec. 20, 1997
(86) PCT No.: PCT/DE97/02994
§ 371 (c)(1),
(2), (4) Date: Aug. 25, 1999
(87) PCT Pub. No.: WO98/28592
PCT Pub. Date: Jul. 2, 1998

(30) Foreign Application Priority Data

Dec. 23, 1996  (DE) .......................................... 196 54 824
Feb. 3, 1997  (DE) ...................................... 297 01 663 U (51) Int. Cl.$^7$ ............................ G01B 9/04; G01B 11/14
(52) U.S. Cl. ................... 356/620; 356/244; 250/458.1; 250/459.1
(58) Field of Search ................................ 356/614, 620, 356/244, 246; 250/458.1, 459.1, 461.1, 461.2

(56) References Cited

U.S. PATENT DOCUMENTS 3,401,458 A  * 9/1968 Mora
4,650,335 A  * 3/1987 Ito et al. ..................... 356/369
5,414,258 A  * 5/1995 Liang ....................... 250/252.1

FOREIGN PATENT DOCUMENTS

DE       2613582    * 10/1977
DE       3226407    *  1/1984

* cited by examiner

Primary Examiner—F. L Evans
(74) Attorney, Agent, or Firm—Davidson, Davidson & Kappel, LLC

(57) ABSTRACT

The invention concerns a method and devices for far field microscopy and flow fluorometry for geometric distance measurements between object structures, i.e. measurement structures, marked with fluorochromes, whereby the distances can be smaller than the half-intensity width of the principle maximum of the point spread function. In this method, the measurement structures are marked with fluorescent dyes with different or identical spectral signatures, according to their distances. Calibration targets with defined dimensions and arrays are marked with the same fluorescent dyes. Calibration targets and measurement structures are prepared separately or together on an object support and investigated microscopically or flow fluorometrically. In each case, two defined calibration targets with different spectral signatures are measured in consideration of the wavelength dependent imaging and localisation behaviour of the optical system used, the measurement values thus obtained are compared against the previously known real distance values and the difference is used as the calibration value for correcting the shift in the direction of the measurement structures caused by the optical system. In the case of the devices, these are calibration targets and an axial tomograph for undertaking the method described above.

26 Claims, 1 Drawing Sheet

METHOD AND DEVICES FOR MEASURING DISTANCES BETWEEN OBJECT STRUCTURES

FIELD OF THE INVENTION

The invention relates to a method and devices for far field microscopy and flow fluorometry for geometric distance measurements between object structures marked with fluorochromes, wherein the distances may be smaller than the half-intensity width of the principle maximum (=full width at half maximum of the intensity peak=FWHM) of the actual point spread function.

BACKGROUND INFORMATION

By employing highly specific markers, such e.g. DNA probes or protein probes, it is possible to mark practically any small (sub-)structures in biological (micro-)objects, in particular in cells, cell nuclei, cell organs or chromosomes (hereinafter also described as objects for abbreviation). Such markers may specifically represent structures in dimensions from several $\mu$m (10–6 m) to a few tens of nm (10–9 m). In these markers normally reporter molecules are integrated, which have a high affinity with complex compounds, to which fluorochromes, but also colloidal microparticles (e.g. gold) are attached. Such fluorochromes/complexes can also be integrated directly into the markers. The available colour emission spectra of fluorochromes stretch from deep blue through green and red to the infrared range of the spectrum. Equally, fluorochromes can be used that do not differentiate in terms of excitation and/or fluorescence emission in their spectrum, but in which the life time of their fluorescence emission is used as a parameter for differentiation. The latter have the advantage that focal shifts depending on the wavelength do not arise. Fluorochromes can also have a different emission spectrum and thus possess different spectral signatures, and yet be stimulated by the same photon energy, e.g. by means of multiple photon processes. It is also possible in this case to avoid wavelength-dependent focal shifts in the excitation between fluorochromes with different spectral signatures.

The above-named fluorochromes bound to specific (sub-)structures in biological micro-objects are referred to hereinafter as fluorescence markers. Fluorescence will be used below to encompass every photon interaction in which differences arise between a material's stimulation spectrum and its emission spectrum that cannot be attributed to monochromatic absorption or dispersion. This also includes in particular multiple photon interactions in which the stimulation wavelengths may be greater than the emission wavelengths. Furthermore, the term fluorescence is also used here for the closely related phenomenon of luminescence, in particular phosphorescence. This includes in particular longer and medium term fluorescence life time, e.g. fluorescence life time in the range of up to several or many msec (milliseconds). The closely related processes of luminescence, phosphorescence and fluorescence will be treated herein as equally relevant to the invention. If the excitation spectrum and/or the emission spectrum and/or the fluorescence life time of two fluorescence markers agree, they have the same spectral signature based on the parameter in question. If they differ in one or more parameters relevant to the measurement, they have different spectral signatures.

A series of light microscopic measuring methods is used for detecting the fluorescence markers in extended biological objects and for the quantitative localisation relative to defined object points/object structures (distance and angle measurements). This is primarily a case of (a) epifluorescence microscopy, (b) confocal laser scanning microscopy, (c) laser scanning flow fluorometry, (d) the far field microscopy process of "point-spread-function-engineering" and (e) standing wave field microscopy.

a) In the case of epifluorescence microscopy with a classical upright or inverse epifluorescence microscope, the biological object is illuminated by the same lens through which it is detected. The excitation light and the fluorescence emitted are discriminated by appropriate optical filters and conducted into different beam paths. The obtainable resolution, i.e. the smallest distance still measurable between two point-shaped object structures that are marked with fluorochromes with the same spectral signature, is given either by the Abbe criterion (=the maximum 0. order of the diffraction pattern of a point object is localised in the 1st minimum of the diffraction pattern of a second point object) or by the half-intensity width of the principle maximum of the actual point spread function. This depends on the wavelength, on the numerical aperture of the lens used and on the local refractive indices of the objects, of the embedding medium, of any cover slip used and of any immersion fluid applied. (In the case of a higher numerical aperture, its dimension may be smaller than the wavelength of the light used for stimulation).

b) In the case of confocal laser scanning microscopy, unlike epifluorescence microscopy, a laser is focused in the lens and the fluorescence is detected confocally. In order to create a three-dimensional image, the object is scanned in all three directions (x, y, z) with the focus point. As in the case of epifluorescence microscopy, the obtainable resolution is given by the half-intensity width of the principle maximum (FWHM)of the actual point spread function and depends on the wavelengths, on the numerical aperture of the lens used and on the local refractive indices of the objects, of the embedding medium, of any cover slip used and of any immersion fluid applied.

c) In the case of laser scanning flow fluorometry, the objects are conducted for example individually through an appropriate light distribution of the focus by a carrier fluid beam that is free or situated or in an optical cuvette (while in the case of epifluorescence microscopy and confocal laser scanning microscopy, the objects are predisposed in a fixed position on object carriers, i.e. object slides, capillaries, chambers, fluids etc.). The light distribution is normally slit-shaped, i.e. the object is scanned with reference to an axis. The obtainable resolution is determined by the width of the focus of the laser beam used and/or suitably selected detection scans, wherein the variability in the object trajectory (=laminar, usually central "fluid filaments" that carry the object) allows for the focal depth and thus also the minimal focal width, regardless of the carrier medium and method. The advantage of flow fluorometric methods is usually found in the relatively higher detection rate, compared to epifluorescence microscopy and confocal laser scanning microscopy, which can reach several thousand objects per second. The focal width complies with the full half-intensity width of the principle maximum of the actual point spread function of the slit-scan optics in the conditions used.

d) In the case of the far field microscopy technique of "point-spread-function-engineering", the point spread function is reduced in width optically. This may be achieved by means of coherently overlapping two or more point spread functions (e.g. 4Pi microscopy) or by means of extinguishing the fluorescence of fluorochromes that are situated in the peripheral area of the central point spread function maximum in question (e.g. STED microscopy, ground depletion microscopy). As the resolution of a microscope is given by the full half-intensity width of the principle maximum of the actual point spread function, the half-intensity width is thus reduced and the resolution improved.

e) In the case of standing wave field microscopy according to U.S. Pat. No. 4,621,911, luminescent preparations are illuminated with a standing wave field in an optical microscope (standing wave field fluorescent microscopy, SWFM). The preparations are set in a zone of equidistant wave fronts and stimulated to fluorescence or phosphorescence. The space between the wave fronts and their phases can be varied to generate patterns. The three-dimensional distribution of fluorescent or luminescent object points can be reconstructed from individual optical sections by means of computer image processing.

The planar wave fronts are generated by coherently overlapping two laser beams at a defined angle to the optical axis of the microscope system, whereby the angle determines the distance between the wave fronts—with given wavelengths and refraction indices. Instead of two intersecting laser beams, the standing wave field can also be generated by making a laser beam interfere with itself at a certain angle after suitable reflection. In microscope construction in these cases, the wave fronts are set perpendicularly to the optical axis of the detecting lens. The fluorescence or luminescence is either spectrally discriminated by means of appropriate optical filters and conducted into different beam paths, as in the epifluorescence microscope, or detected confocally. As in the case of epifluorescence microscopy and confocal laser scanning microscopy, the obtainable resolution is given by the full half-intensity width of the principle maximum of the actual point spread function and depends on the given wavelength, on the numerical aperture of the lens used and on the local refractive indices of the objects, of the embedding medium, of any cover slip used and of any immersion fluid applied.

Laterally, the system has a resolution akin to a conventional epifluorescence microscope or a confocal laser scanning microscope; axially, on the other hand, a depth discrimination and thus a considerably better resolution is achieved.

DISADVANTAGES OF THE STATE OF THE ART

1) As the actual point spread functions are strongly influenced by the local refraction index and absorption in the object, in the object's embedding medium and in the immersion (including any cover slips present), the measurement of distances between object structures depends on the actual point spread function-i.e. the one given locally in the marked object point. This generally differs clearly from calculated point spread functions of the microscope used. The technically optimised marginal conditions of measured point spread functions also generally differ from the actual point spread functions obtainable in biological objects under practical routine laboratory conditions. As these actual point spread functions are mostly not available, distance measurements for calibrating purposes are usually made by referring to ideal, calculated results or to calibration measurements that are made under standard conditions, such as e.g. reflection methods. Both methods are detrimental to accuracy in three-dimensional distance measurement in biological micro-objects. As a result, there is considerable uncertainty in the determination of the real spatial distance between the object structures; in the case of biological objects, quantitative size estimates contain uncertainties of up to several micrometers. There is only a limited possibility to correct this error with the methods used hitherto, i.e. only under standard conditions, whose actual achievement/compliance in the biological object cannot be controlled or guaranteed accurately, however.

Two object structures with the same spectral signature can then only be separated if the distance between them is at least a half-intensity width of the principle maximum of the actual point spread function.

2) All the ar field methods described above suffer from the problem that the half width of the principle maximum of the point spread function and thus the limits of resolution depend on the relative position in space. Thus, in the case of epifluorescence microscopy or confocal laser scanning microscopy, for example, the point spread function is narrower laterally (perpendicular to the optical axis) than axially (in the direction of the optical axis). In the case of static microscopy methods, this disadvantage can be overcome with the aid of so-called micro-axial tomography. In this method, the (biological) objects are set in capillaries or on glass fibres and rotated around an axis under defined conditions in the microscope, which is normally perpendicular to the microscope's optical axis. In this case, distance measurements are made in the direction with the narrowest half-intensity width of the actual point spread function. This method can hardly be applied, however, in the case of flow fluorometry.

3) In the case of "mono-dimensional" standing wave field microscopy (SWFM), the periodical wave field in the case of epifluorescent detection in connection with optical sectioning leads to ambiguity in the image of the object structures greater than $\lambda/2$ n ($\lambda$=wavelength of the excitation, n=actual refraction index). This ambiguity primarily makes it difficult to make any effective use of the improvement in resolution achieved by means of the interference pattern.

4) According to the state of the art, high precision distance measurements with light microscopy far field methods can only be made as far as the range of dimensions of a hundred nanometers. For measurements in the range of distances and accuracy of the order of 10 nm, the methods of electron microscopy, scanning tunnel microscopy, atomic force microscopy and biological and optical near-field microscopy are used. Nevertheless, these are surface-oriented and not volume-oriented methods-unlike the optical far field method; in other words, they are in principle useful only for structural investigations and distance measurements on surfaces and in thin layers. In any event, information about the position of objects or object structures in three dimensions can be obtained using mechanically prepared cut series and evaluating measurements in individual image sections. Three-dimensional measurements in intact or even vital biological micro-objects, such as three-dimensional (conserved) cells, cell nuclei or cellular organs, are not possible.

SUMMARY OF THE INVENTION

The task of the invention is to prepare a method for far field light microscopy and a device for executing this method, with which it is possible to make highly accurate distance measurements between object structures whose reciprocal distance is smaller than the resolution capacity of the far field microscope in question, i.e. that are separated by less than the half-intensity width of the maximum of the actual point spread function, regardless of the position of the object structures in question in the three-dimensional space.

One solution to this task consists of preparing a method of the kind described above that is a calibrating process for fluorescence far field microscopy and includes the following process steps:

Before, during or after the preparation of the object in question on or in an object carrier, in particular object slides, fibres/capillaries or fluids, the structures to be investigated or localised (measurement structures) are labelled with fluorescent dyes with different and/or identical spectral signatures, i.e. such structures (measurement structures) to be localised as are located in each others' immediate vicinities, i.e. within the half-intensity width of the principle maximum of their actual point spread function, are labelled with fluorescent dyes with different spectral signatures, while such measurement structures as are located at distances greater than that of the half-intensity width of the principle maximum of the actual point spread function are labelled with fluorescent dyes with different or equal spectral signatures. Two measurement structures to be localised can thus always be labelled with the same spectral signature, if for example they can be identified clearly by means of their relative positions or other criteria.

calibration targets of defined sizes and spatial arrays are labelled with the same fluorescent dyes, the fluorescent calibration targets are prepared, either together with the objects or separately on or in an object carrier (object slides, fibres/capillaries, fluids or the like).

objects (of investigation) and calibration targets are investigated microscopically or flow fluorometrically in corresponding conditions, simultaneously or one after another.

pairs of defined calibration targets with different spectral signatures are measured in consideration of the wavelength-dependent imaging and localisation behaviour of the optical system in question (microscope or flow fluorometer); the values thus measured—the actual values—are compared to the previously known real distance values—the nominal values (i.e. the nominal localisation calculated on the basis of geometry), and the difference between the actual values and the nominal values, i.e. the calibration value, is used to correct the offset caused by the optical system in the detection of different emission loci, in particular in the measurement structures.

In other words, the distance measurement between the object (sub-) structures—hereinafter also described as measurement structures—marked (according to the distances between them) with different or identical spectral signatures is made using the high precision localisation of independent (calibration) targets with a conforming spectral signature with a known size and spatial array, in consideration of the wavelength-dependent imaging and localisation behaviour of the optical system in question, whereby the calibration measurement between the (calibration) targets and the measurement in the biological objects takes place in the same system and marginal conditions. These calibration targets have the same or a higher multi-spectrality as or than the (object) structures to be measured. They can be arrayed directly in the biological objects or as a separate preparation on an object carrier (object slides, fibres/capillaries, fluids or the like) or be part of an object carrier.

Two or more fluorescent measurement structures in intact, three-dimensional biological objects, whose distance and extension is less than the half-intensity width of the principle maximum of their actual point spread function, can be discriminated on the basis of their different spectral signature (fluorescence absorption wavelengths and/or fluorescence emission wavelengths and/or fluorescence emission life time), i.e. their distances can be determined.

The distance measurement can be reduced to the localisation of the individual measurement structures and can—now also in optical far field microscopy or flow fluorometry—by carried out with a considerably higher accuracy than the half-intensity width of the maximum of the point spread function. The localisation of the barycentre of the measurement structures in question is adapted to the maximum intensity of their fluorescence signals. In other words, the barycentre of the signal and thus the location of the measurement structure are determined from the measured (diffraction limited) signal (=intensity curve) of a fluorescence point (=fluorescence measurement structure)-in consideration of the overall information from the minor and major maxima. In the case of an error-free optical system and consequently ideal symmetry of the measured intensity distribution (=course of the intensity curve), the barycentre of the intensity curve co-localises within the localisation accuracy with the main maximum (=maximum 0. order of the diffraction pattern) of the measured intensity distribution.

The method in accordance with the present invention enables optical far field region microscopy or scanning flow fluorometry to be used to measure distances in biological micro-objects, whereby the distances to be determined may be smaller than the half-intensity width of the principle maximum of the actual point spread function in the object. As the information content of the distance determination carried out in accordance with the invention complies with a distance measurement made with higher resolution, it is also possible to speak summarily in terms of resolution equivalent. The measurements of such small distances in biological micro-objects is of great significance for example for scientific questions in biology and medicine, but also for certain aspects of clinical research and diagnostics of preparations.

Multispectral calibration allows in situ measurements to be made of concrete biological objects via the system's image behaviour. If fluorescence life time is used as the only type of parameter and/or if the fluorochromes are excited with the same photon energy/ies, the in situ correction of the chromatic shift in the object plane is no longer necessary. For high resolution far field microscope types, such as e.g. the standing wave field microscope, and when fluorescence markers according to the invention are used, the invention enables three-dimensional geometric distance measurements to be made in biological objects right down to molecular accuracy (i.e. resolution equivalent better than 10 nm).

Unlike electron microscopy or optical or non-optical near field microscopy, the three-dimensional structure of the object to be investigated remains intact, as there is no need for mechanical sectioning. 3D distance measurements with a range smaller than the half-intensity width of the maximum of the actual point spread function can thus be undertaken in three-dimensionally conserved micro-objects. In particular, the method makes it possible to undertake three-dimensional distance measurements also in vital conditions of the biological object. Compared to the methods of point spread function engineering known to the state of the art, a considerable advantage in the invention consists of the fact that already existing systems for quantitative fluorescence microscopy can also be used as a basis for the increase according to the invention of the resolution equivalent.

Both one and two-dimensional scanning and also non-scanning electronic or opto-electronic detector systems are suitable for detecting the fluorescence emission.

One application of the method according to the invention is particularly useful for multispectral precision distance measurements in biological micro-objects for the absolute and relative localisation and distance measurement of fluorescent measurement structures with any spectral signature.

DETAILED DESCRIPTION OF THE PREFERRED EMBODIMENTS

In order to achieve as sharp a point spread function as possible when using static microscope systems, it should be possible to turn the biological object of the microscopic investigation axial-tomographically (micro-axial tomography). In this way, anisotropies in the 3D point spread function can be overcome so that two object points at a time lay in a plane with the given best point spread function. The biological object is preferably fixed in or on a rotating carrier with a circular, quadrangular or polygonal cross-section or fixed in some other way.

The carrier consists of a material transparent to the light wavelengths used, whose refraction index differs from the surrounding medium by 12 percent at the most. It may be hollow or solid and its cross-sectional diameter should be less than or equal to 300 $\mu$m.

In one preferred embodiment of the method according to the invention, the carrier (with a triangular, rectangular or polygonal cross-section) for the axial tomographic investigations is rotated through the angle $\phi_m=360/3[\circ]$, $\phi_m=360/4[\circ]$, or $\phi_m=360/n[\circ]$, where n is the number of the planar sides of the carrier. A distance measurement between the calibration targets and/or measurement structures is undertaken at one, several or each of these angles, in each case for one, two or several spectral signatures.

The following method steps are preferably undertaken to determine the actual and nominal values to compare them and define the correction/calibration value:

one or more calibration targets B at a distance greater than the half-intensity width of the principle maximum of the actual point spread function from the barycentre of the N measurement structures is/are marked with a random spectral signature;

the distances $d_{ik}$ (i, k=1 ... N, i≠k) of the barycentres of the spectrally separated diffraction figures of the N measurement structures and the distances $d_{iB}$ of the N measurements structures to the calibration target B are measured, using automated image analysis processes;

for one measurement structure, the stretches $d_{ik}$ and $d_{iB}$ at the moment in the plane of the narrowest point spread function and all other distances are measured, while the object is axial-tomographically rotated each time through a defined angle $\phi_m$;

optical aberrations from the calibration measurements are corrected, and a cosine function $A_{ik} \cos(\phi_m+\Theta_{ik})$ or $A_{iB} \cos(\phi_m+\Theta_{iB})$ with suitable phase dislocation is adapted on each occasion to the corrected measured distances $d_{ik}(\phi_m)$ and $d_{iB}(\phi_m)$;

the maxima $A_{ik}$ and $A_{iB}$ of the adaptation function of $d_{ik}$ or $d_{iB}$ are divided by the multiplication factor and determined as a Euclidean distance $D_{ik}$ or $D_{iB}$ between the N measurement structures or between the measurement structures and the point of reference B.

In order to determine the maxima, the relative minima of the distance $Z_{ik}$, $Z_{iB}$ in the plane orthogonal to the plane of the $d_{ik}$, $d_{iB}$ should preferably be involved and analogically evaluated.

According to the invention, all the co-ordinates of the N measurement structures and their co-ordinates with relation to the point of reference B, i.e. the positions $x_i$, $y_i$, $z_i$ and $x_k$, $y_k$, $z_k$, as well as the distances $x_k-x_i$, $y_k-y_i$, $z_k-z_i$ and $x_B-x_i$, $y_B-y_i$, $z_B-z_i$, are identified on the basis of the microscopically measured 3D distances $D_{ik}$ or $D_{iB}$, preferably using the following system of equations:

$$D_{ik}^2 = (x_k - x_i)^2 + (y_k - y_i)^2 + (z_k - z_i)^2$$
$$D_{iB}^2 = (x_B - x_i)^2 + (y_B - y_i)^2 + (z_B - z_i)^2$$
$$D_{kb}^2 = (x_B - x_k)^2 + (y_B - y_k)^2 + (z_B - z_k)^2$$

To guarantee the measurement results determined, the method described above should be carried out for several calibration targets B and the same N measurement structures.

The co-ordinates and distances of the N measurement structures can be determined using the barycentres resulting from the barycentre centering of the measurements to all the points of reference.

In particular for graphic representations, the positions determined $x_i$, $y_i$, $z_i$ and $x_B$, $y_B$, $z_B$ are preferably convolved with a point spread function with a half-intensity width with the resolution equivalent achieved in each case.

For the purposes of fluorochrome labelling of the measurement structures and calibration targets, such fluorochromes are preferably used as can be stimulated in the ultra-violet, visible and/or infrared light wavelength range and that emit in the ultra-violet, visible and/or infrared light wavelength range.

In the case of one preferred embodiment of the invention, labelled regions of the biological object with a known distance from each other are used as calibration targets. This labelling can be carried out with suitable biochemical probes, for example.

The use of biological calibration targets has the practical advantage in comparison to the use of synthetic calibration targets, such as calibration beads, that, along with the optical marginal conditions of the object, additional preparatively conditioned marginal effects in the calibration are perceived during the calibration, such as for example the behaviour of an actual fluorescence signal against an unspecified background (which is determined by automatic image analysis algorithms).

Particularly suitable non-biological or synthetic calibration targets are micro-beads with the same or a higher multispectral signature as or than the measurement structures to be localised. These are treated in the same way as the biological objects. Such calibration targets are preferably fixed to object carriers in defined spatial arrays. They may already be fixed when the object carriers in question are manufactured, which is particularly advantageous for routine use.

In order to undertake the distance measurement according to the invention using a microscope with axial tomography, the biological objects are prepared with the measurement structures and the calibration target(s) in or on a microcapillary or glass fibre as an object support or object carrier. The capillary/fibre has a precisely defined diameter, of which a variety is possible. In order to affix this capillary/fibre to the microscope stage, the invention proposes a special mount consisting of a rigid, preferably dorsiventrally flattened frame on or against which at least one bearing bush is mounted, in which a microcapillary or glass fibre can be placed so that it can be rotated around its longitudinal axis and with its rotation axis perpendicular to the microscope's optical axis. The bearing brush(es) should be set in such a way that the rotation axis of the capillary/fibre runs perpendicular to the microscope's optical axis. The object of the investigation fixed or on the capillary/fibre is rotated by turning the capillary/fibre directly, preferably using a torque motor. This has the advantage that once the microscope lens has been focused and adjusted, it can be kept unchanged. Provision is made for a replaceable insert for the frame to support or stabilise the capillary/fibre that has to be rotated against sagging or displacement in the area of the frame recess. This insert can be made in particular of plastic or glass and have a grave-shaped excavation in the longitudinal direction of the capillary/fibre. To facilitate handling, in particular during insertion in the frame, this insert can have one or more fixation slits.

The frame according to the invention preferably has the same external dimensions as a conventional object slides, i.e. it is less than 77 mm long and less than 27 mm wide, and it is very light, i.e. it weighs for example only about 15 grammes. Using a computer controlled stepping motor, the capillary/fibre can be turned through an exactly defined angle about its axis. As this rotation force is exerted directly on the capillary/fibre and not on its mount, there is a considerable reduction in the danger that the capillary/fibre will be displaced and end up outside the microscope's visual field or even that the whole microscope platform is disturbed or pushed.

In order to undertake the distance measurement method according to the invention using a laser scan flow fluorometer, containing a fluid stream flowing freely or in an optical cuvette, and with one or more laser beam source(s), whose laser beam(s) is/are focused on the central trajectory of the fluid stream, the laser lens should be chosen and arrayed in such a way that the laser beam(s) is/are focused in the form of a band on the object trajectory (the central trajectory of the fluid beam leading the objects).

For this purpose, the band form of this/these laser beam(s) can be generated simply and preferably by interference fringes of two or more intercrossing partial beams. The lenses and slits in the detection beam path are preferably selected and arrayed so that only the fluorescence emission from the central interference fringe is depicted on the detector. In addition, the detector should be divided into individual detection pixels, in order to make a spatial resolution of the fluorescence emission in both the flow direction and perpendicular to the flow direction possible. This has the advantage that the fluorescent measurement structures and/or calibration targets can be localised not only in the flow direction, because of the movement of the object at a constant speed, but also perpendicular to it.

In the case of a fluid stream in the z direction and a laser lens from laser beam(s) in the x direction and slit(s) and detector(s) in the y direction, the method enables the resolution in two dimensions to be improved. If a laser lens with laser beam(s) in the y direction and scan(s) and detector(s) in the x direction are added, there is an improvement in resolution in three dimensions. In both cases, it is possible to generate point spread functions that are practically independent of the object's orientation.

In accordance with on embodiment of the present invention, a distance measurement between gene sections of chromosomes in a cell nucleus (regardless of microscope type) is performed In a cell nucleus, the chromatin of the individual chromosomes occupies defined partial regions. Within one or more of such chromosomal domains, the structures to be localised, i.e. the measurement structures, e.g. small chromosome sections such as genes or parts of genes, are labelled specifically with a method, known to the state of the art, of fluorescence in situ hybridising, using fluorochromes with certain different spectral signatures M1, M2, M3, . . . The distances between the labelled locations (the marked measurement structures) are below the classical resolution, i.e. they are smaller than the half-intensity width of the maximum of the actual point spread function. The (object) structures (measurement structures) are marked in such a way that the spectral signatures are represented on the structures to be localised (measurement structures) with practically the same dynamic.

The biological object is prepared on a glass fibre with an exactly defined diameter or in a round or quadrangular capillary with defined dimensions.

In order to determine the dimensions, microscopable preparations with calibration targets are produced under the same physical and chemical experimental conditions as the object or the object structures to be localised (=measurement structures).

The following are used as preparations or calibration targets, for example:

a) micro-injectable spheres (beads) of one spectral signature (monochromatic):

According to known methods, the beads are each marked with one fluorochrome, i.e. monochromatically, and can be differentiated from the structures to be measured (to be localised) in the object (the measurement structures) on the basis of their size. Such calibration beads, which represent the spectral signatures of the measurement structures present in the object, but otherwise are preferably identical (with regard to size, geometry, constituent material etc.) are injected. In other words, the spectral signatures of the measurement structures and of the calibration targets are selected in such a way that, in the given experimental conditions, the fluorescence emissions originating from them can be analysed separately. The monochromatic calibration beads are injected and fixed in such a way that the individual beads with different spectral signatures are arrayed in clusters directly on the surface of the glass fibre or the wall of the capillary, preferably in a cross-section plane of the fibre or capillary. When precision fibres and/or capillaries are used, the beads follow at given distances from each other or from a plane, an axis or a line of reference.

b) micro-injectable test spheres (beads) with multispectral (polychromatic) signature and identical spectral dynamic:

According to the known method, the beads are each marked with all the spectral signatures occurring in the marked (object) structures (measurement structures). As a result, they can be injected in random positions into the biological object (in this case a nucleus) to be measured. A nominal geometry as in a) is not necessary, as for each signature the chromatic barycentres should be localised in the same position. In order to differentiate between the marked (object) structures (measurement structures), the beads can either belong to a different class of size or also carry an extra spectral signature, which is not found in most structures to be measured, i.e. the measurement structures (according to the preparation protocol).

c) simultaneously labelled chromosome regions at a known distance of a chromosome other than the one that carries the structures to be localised (measurement structures):

The calibration target, i.e. in this case the chromosome regions at a known distance from each other, are differently marked with the aid of a test combination of DNA sequences that bears the different spectral signatures. The chromosomal calibration targets can be differentiated from the (chromosome) structures to be localised (measurement structures) for example by means of different fluorescence intensity or of a different intensity relationship between fluorochromes with different spectral signatures or of the use of an additional fluorochrome with a different spectral signature that was not used for the fluorescent labelling of the measurement target.

It is also possible that the calibration target belongs to a different class of dimensions from the measurement structures to be localised.

The distance measurements according to the invention are carried out using known far field microscopy equipment, consisting of a microscope, a photomultiplier and/or camera and a data processing unit. In this way, the distances between the calibration targets are measured using fluorochrome markings with different spectral signatures. The localisations thus measured (i.e. the target distances thus measured) are compared against the nominal localisations calculated using geometry (i.e. the real target distances), leading to the deduction of the spectrally caused shift. This shift is the calibration value for the distance values measured between the (object) structures to be localised (measurement structures).

As this shift depends on the optical properties of the preparation (e.g. refractive indices in the nuclei and the preparation medium), the calibration should take place in situ. In the case of the example in hand, this means that the calibration target should be located in the nucleus, alongside the (chromosomal) structures to be investigated and marked (measurement structures). The distances between the (object) structures to be localised (measurement structures) or the distances between the different colour signals or colour points of the measurement structures in question, e.g. between the red fluorescent and the green fluorescent colour point (from maximum intensity to maximum intensity or from barycentre to barycentre), are measured and this measurement value is subjected to high precision correction by the shift detected with the calibration target (caused by the different spectral signature).

In the case of calibration targets in the form of microinjectable test spheres with multispectral (polychromatic) signatures, the chromatic shift is determined for each signature from the difference in localisation of the barycentres. The identification necessary for this purpose of the fluorescence emission belonging to a calibration target can be undertaken for example by means of a volume-conserving thresholding process or by averaging the segmentation results in the case of threshold variation.

The chromatic shift is determined in precisely the same way in the case of calibration targets in the form of object regions with multispectral (polychrome) signatures marked with fluorochromes.

When centromer regions are hybridised with a test combination of such DNA sequences that bind them all to the same chromosomal DNA sections, yet are labelled with fluorochromes with different spectral signatures, they are also particularly suitable as fluorochromatically marked calibration regions. If the hybridisation is undertaken under even more stringent conditions, there are two labelling regions per cell nucleus; in the case of less stringent conditions, extra centromer regions are labelled because of additional minor binding regions, so that the number of the calibration regions increases. In some circumstances this is a great advantage.

Figure 1:
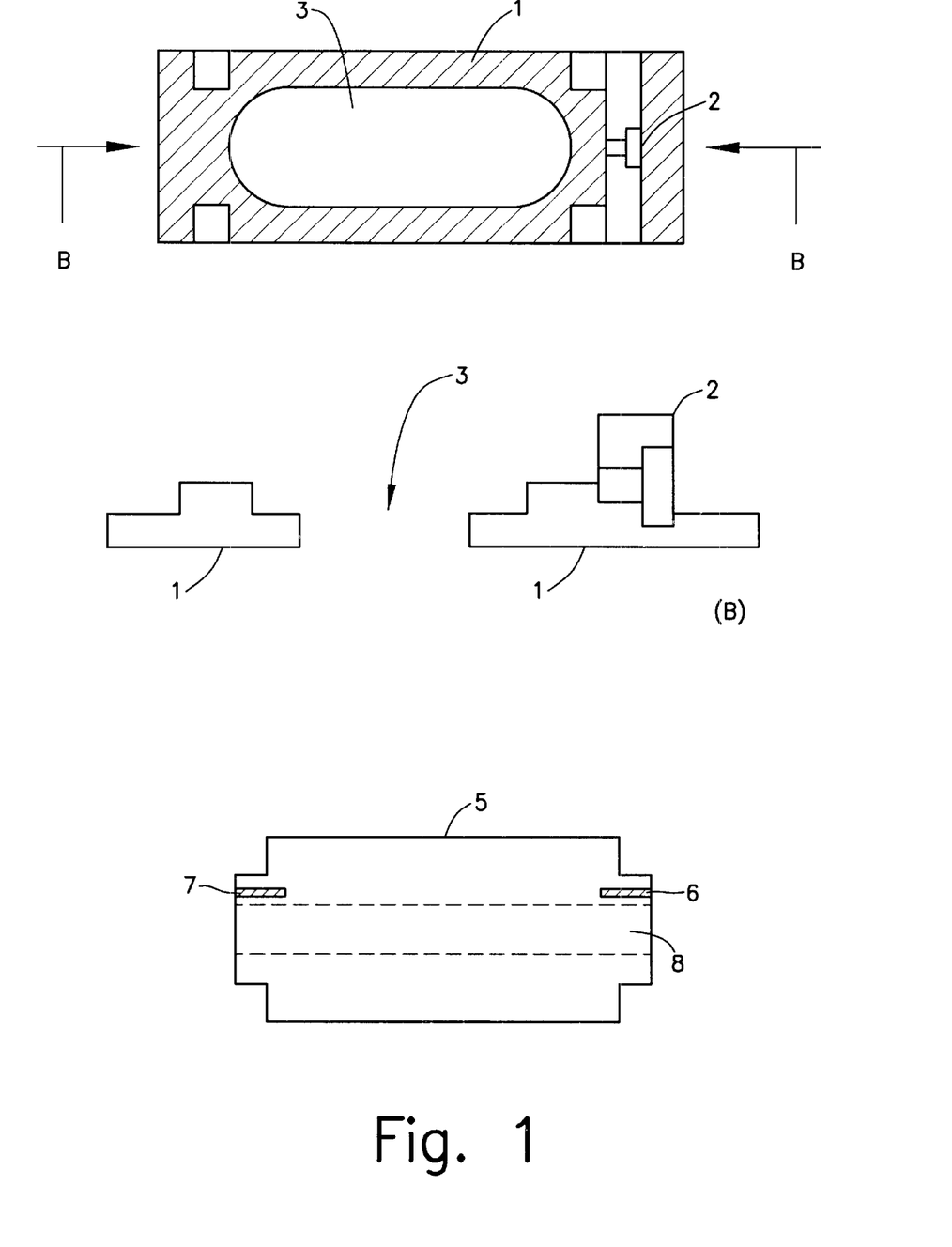
FIG. 1 illustrates a mounting according to the invention.

In accordance with a second embodiment of the invention, distance measurement between gene sections of a chromosome in a cell nucleus using an epifluorescence microscope with axial tomography In order to undertake the method according to the invention, an epifluorescence microscope with axial tomography whose construction principle is known is modified as follows:

Instead of an object slides, a mount according to the invention as in FIG. 1 for microcapillaries or glass fibres is placed on the microscope stage. This mount consists of a rigid, preferably dorsiventrally flattened frame 1, on which a bearing bush 2 is mounted, in which a microcapillary or glass fibre that can rotate about its own axis and with its rotation axis perpendicular to the microscope's optical axis is set. The object of investigation fixed in or on the capillary/fibre is directly rotated by turning the capillary/fibre, either manually or by means of a torque motor. This has the advantage that once the microscope lens has been focused and adjusted, it can be kept unchanged.

In order to support or stabilise the capillary/fibre to be rotated against sag and dislocation in the area of the recess 3 of the frame 1, a replaceable flat, slice-shaped insert 5 is set in the frame 1. This insert 5 consists of plastic and has a grave-shaped excavation 8, which stretches under and in the longitudinal direction of the capillary/fibre. In the area of its border, the insert 5 is equipped with two slit-shaped recesses 6, 7, which both stretch perpendicularly to the edge of the border and facilitate the insertion of the insert 5 in the frame 1. With a computer controlled stepping motor, the capillary/fibre is rotated in the bearing bush through a known angle about its own axis. The turning force is applied directly to the capillary/fibre (and not to the mount), thus practically completely avoiding the danger that the capillary/fibre is displaced and ends up outside the microscope's visual field or even that the whole microscope stage is disturbed or pushed.

The biological micro-object, i.e. a cell nucleus, in which the measurement structures to be localised are already marked with fluorochromes and that already also contains calibration targets (for preparation see Embodiment 1), is located on the glass fibre or in the microcapillary. The distance between two or more measurement structures or calibration targets is smaller than the half-intensity width of the principle maximum of the axial actual point spread function. With the axial tomograph, the object is rotated if necessary with automatic refocusing. The rotation takes place in such a way that each distance between two measurement structures or calibration targets (i.e. between their fluorescence intensity barycentres) is maximum. The maximum distance measured is the equivalent of the actual distance.

If the only thing of interest is the distances between the measurement structures or calibration targets, i.e. not their absolute spatial array, it is now possible to proceed from one of the known measurement structures or calibration targets to maximise and determine the distance to a third measurement structure or a third calibration target. If the distances between the measurement structures or the calibration targets are larger than the half-intensity width of the maximum of the lateral (perpendicular to the optical axis) point spread function, then a single spectral signature is sufficient; if on the other hand the distances are smaller, the measurement structures or calibration targets must be differentiated by means of multispectral signature. The barycentres (maxima) of the signals are used for localisation. To the extent to which the measurement structures investigated have a diameter that is smaller than the half-intensity width of the maximum of the actual lateral point spread function, all the refraction patterns of the measurement structures or calibration targets will be determined by means of a sharp point spread function, so that the maxima can be determined optimally. If distances that are also greater than the half-intensity width of the maximum of the lateral point spread function are permitted between the measurement structures or calibration targets, then it is only possible to determine all the distances between the measurement structures or calibration targets for $N \geq 2$ within a nucleus with a single rotation if series of optical sections are recorded at every rotation angle (see Embodiment 3 on confocal laser scanning microscopy).

If it is the absolute array of the measurement structures or calibration targets in space that is of interest, then the respective barycentres must be determined accurately. The absolute localisation of the measurement structures or calibration targets, i.e. the angle measurement, can be improved by multiple repetition of the whole measurement procedure and statistic evaluation.

In accordance with a third embodiment of the invention, a distance measurement between gene sections of chromosomes in a cell nucleus is preformed a confocal laser scanning microscope.

A series of optical sections is taken from the biological micro-object, e.g. a cell nucleus, in which the measurement structure to be localised has already been marked with fluorochromes and that also already contains calibration targets (for preparation see Embodiment 1). The measurement structures have l=1, 2 . . . L spectral signatures. The spectral signature of the calibration targets are differentiated from those of the measurement volumes for example in terms of volume, diameter, intensity or of the number of spectral signatures (l=1, 2 . . . L+1). The images of the optical sections are taken separately for each spectral signature and if necessary corrected according to the background.

For evaluation purposes, the calibration targets are first identified and the chromatic shift determined. To this end, the calibration targets are localised under each spectral signature. In the case of polychromatic calibration targets, the spectral shift is the result of the difference between the localisations.

Secondly, the measurement structures are localised in parallel to or in connection with the calibration. The position of the barycentres of the intensity signals measured is first determined in this way in each spectral signature. The localisations are then corrected by the spectral shift resulting from the calibration measurements.

The corrected positions of the measurement structures are given in relation to a point of reference. This point of reference may be a randomly chosen fix point in the object or the barycentre of a calibration target (e.g. a labelled chromosome region) or an otherwise chosen chromosome territory. It may however also be the barycentre co-ordinates of all the measurement structures within a chromosome territory.

The measurement methods described for confocal laser scanning microscopy can also be undertaken in connection with axial tomography. In this case, the biological micro-object is rotated through a given angle and a complete 3D image series is taken per angle, as described in Embodiment 2. The size of the angle of rotation is determined in such a way that each distance between two measurement structures is maximised. The process is then undertaken for each 3D image series, as described in Embodiment 2. The advantage of this rotation is that a distance is drawn between the localisation of two points that is determined in the lateral plane and thus on the basis of the sharpest (steepest) point spread function.

Instead of undertaking the calibration and distance measurement between the structures to be localised, i.e. the measurement structures, in the same biological object as described above, it is also possible to undertake the calibration independently of the measurement structures on the same type of biological objects. In this variation on the method, the difference between the fluorescence signals of the calibration targets and those of the measurement structures is facilitated. Using the values of the optical shift established with the calibration targets, it is possible to determine the calibration curves for the distance measurements between measurement structures. This type of calibration curve makes statements for example about the spectral shift as a function of the refraction index and absorption of the immersion medium used, of the lens, filter and detection units used, of the evaluation algorithm used, of the biological object used, of the axial and lateral localisation of the measurement structures or calibration targets in them and so on. The use of information from this special calibration curve for distance measurements according to the invention is particularly advantageous in cases in which a greater accuracy tolerance may be used.

In accordance with a fourth embodiment of the invention, a distance measurement between gene sections of chromosomes in a cell nucleus is parfomed using a wave field microscope The execution of the method according to the invention for measuring distances using the wave field microscope is practically identical to the method described in Embodiment 3. Unlike the confocal laser scanning microscope, the localisation is significantly more accurate in the axial direction than the lateral direction in this case, as this is where the sharpest (steepest) point spread function is found. By combining this with axial tomography, the accuracy of the position determination and distance measurement can be increased even further.

In accordance with a fifth embodiment of the invention, a distance measurement between gene sections of chromosomes in a cell nucleus using a laser scanning flow fluorometer The basic unit used for a laser scanning flow fluorometer is a flow cytometer, of the kind used routinely today for example for cell analyses and sorting in immunology or haemotology. In this case, the biological objects are arrayed in a fluid system in such a way that they are conducted individually one after another through one or more laser foci into the area of the central trajectory of a fluid beam that flows freely or in an optical cell. The biological object, in this example the metaphase chromosomes, are specifically labelled with one or more fluorescence markers and are excited selectively to fluoresce by the laser beams. The fluorescence is normally registered in several optical detection channels separated by spectral filters and transmitted integrally by photomultipliers into an amplified electric signal.

In order to be able to measure the fluorescence distribution with spatial resolution in one direction, so-called slit scan methods were established. The biological object, in this case metaphase chromosomes, i.e. elongated objects measuring typically from 5 to 15 µm, are conducted by a fluid stream at a constant speed through one or more laser beams that are focused so sharply in the flow direction that the fluorescence distribution is measured along the object in a time dependent way. On the basis of the known flow speed, it is possible to transform the mono-dimensional, time dependent fluorescence profile taken per detection channel into localisation information. The flow speeds are typically up to 10 m/sec and up to several thousand objects per second can be analysed.

All slit-scan systems described before now in the literature have a typical focal width in the flow direction (measured from the actual point spread function) of at least about 2 µm (=resolution equivalent), as the focal depth decreases significantly with sharp laser focusing for fundamental reasons, so that a uniform resolution in the field of possible particle trajectories (typically 10 µm about the central axis of the fluid beam) can no longer be guaranteed. In addition, in the case of the methods described in the state of the art, only a mono-dimensional scan is possible.

In order to undertake the method of distance measurement according to the invention in the area of nanometers, a laser scanning flow fluorometer whose principle of construction is known is modified by the following arrangement (represented here by way of example for one laser and one detection channel):

Two coherent partial beams of the laser with identical intensity and even wave fronts are focused on each other at a small angle in the fluid beam and brought to interference in the focal area. The result is a pattern of constructive and destructive interference, wherein the interference fringes are orientated perpendicularly to the flow direction. The half-intensity width of the interference fringe does not depend on the width of the laser focus any more, but only on the wavelength and on the angle of incidence between the laser partial beams. In the case of an angle of 28° between the two partial beams, the half-intensity width of the full interference fringe can be estimated at about 500 nm for laser wavelengths of 500 nm.

The interference fringes can be generated with the depth necessary for all possible object trajectories of the fluid stream to be illuminated with the same fringe width.

As several interference fringes are generated at the same time, the object information is ambiguous. The known method of convolving the measured intensity distribution with the fringe pattern, i.e. with the point spread function, brings no or only a very small gain in resolution with respect to the conventional slit-scan process, as higher localisation frequency and thus resolution is lost because of a suitable selectable noise filter. According to the invention, the following method is adopted instead of this:

Slits with a slit direction parallel to the orientation of the interference fringe are built into the detection lens. Using suitable lenses, these slit-scans only take those fluorescences on the photomultiplier that are stimulated between the first two minima of the interference main fringe. In this embodiment, object trajectories of 6 µm about the central fluid axis can be observed or investigated with practically identical optical resolution using a 19° aperture angle of the detection lens (in air) and a minimal distance of ca. 1 µm.

In order to undertake more than just mono-dimensional scans, the detection slit is divided into small rectangular elements-e.g. by means of a CCD line. Signal amplifying optical elements can be pre-switched to these CCD elements. The CCD elements are preferably arrayed in as large a segment of a circle as possible around the fluid stream. The detection lens can then be partly replaced by microlenses in front of each element.

One alternative consists of arraying a laser lens of laser beam(s) in the x direction and slit(s) and detector(s) in the y direction with a fluid stream in the z direction, whereby an improvement in the resolution in two dimensions is achieved. If a further laser lens is arrayed with laser beam(s) in the y direction and slit(s) and detector(s) in the x direction, the result is an improvement in resolution in three dimensions.

For each detection element, one fluorescence profile is taken through the object that is randomly oriented and moved at a constant speed in the fluid stream through the central laser interference fringe. Small fluorescent measurement structures or calibration targets in the biological objects appear in the scan profiles as intensity peaks. The fluorescent measurement structures or calibration targets can be localised in the object on the basis of the intensity maxima and the array of the scan profiles in question to the CCD elements. This can also take place with identical spectral signatures, for example with regard to a defined object point of reference.

In the case of different spectral signatures, it is possible to use for example laser beams with different wavelengths and/or several detection units. By means of calibration, the localisations of the individual measurement structures or calibration targets with different spectral signatures can then be related to each other. The calibration and computation is then undertaken in terms of the above-described embodiments for epifluorescence or confocal laser scanning microscopy.

In accordance with a sixth embodiment of the invention, using the distance measurement method according to the invention is used for optically controlling arrays of electronic components (electronic chips)

When electronic components (electronic chips) are arrayed, the planned presence of certain components and their geometric array must be checked. As commercially available chip measurements are very small and the individual components are closely related to each other, the necessary control processes according to the state of the art are extremely expensive and not always satisfactorily accurate, The distance measurement method according to the invention now enables the number and array of the components on a chip to be checked also in cases when the minimal distance between individual chips is smaller or even very much smaller than the half-intensity width of the principle maximum of the point spread function.

For this purpose, the components are marked with fluorescent dyes, for example on their surfaces, so that at least those components whose distance is smaller than the half-intensity width of the principle maximum of the point spread function are provided with fluorescent dyes with different spectral signatures.

It is now possible to check the correct array of the components with optical analyses, using the distance measurement methods according to the invention and random far field microscopy methods, whereby instead of the conventionally necessary lens with a relatively high numerical aperture, such as 1.3, it is now quite possible to use lenses with significantly smaller numerical apertures without for this reason losing any relevant information. With lenses with a smaller aperture, a larger working distance between the lens and the object of investigation is possible, which significantly facilitates handling and makes the investigations faster and more certain. Using the method according to the invention, it is also possible the check the specified array of those components whose distance is smaller than 200 $\mu$m. This has the advantage that it is possible to do without the use of technically very costly optical near field methods and/or atomic force microscopy or tunnel electron microscopy methods.

Instead of electronic chips, it is equally possible to check DNA chips or protein chips in a similar way.

What is claimed is:

1. A method for applying far field microscopy and/or flow fluorometry to geometric distance measurements between object structures, wherein the distances can be smaller than the half-intensity width of the principle maximum of the point spread function, comprising the steps of:

marking measurement structures to be investigated or localised with fluorescent dyes before, during or after preparation of an object on or in an object carrier, wherein at least the measurement structures to be localised whose distance is smaller than a half-intensity width of a principle maximum of a point spread function are marked with fluorescent dyes with different spectral signatures, marking calibration targets with a defined size and array with the same fluorescent dyes, preparing the fluorescent calibration targets either together with the measurement structures in or on an object carrier or separately in or on an object carrier, investigating the measurement structures and calibration targets under corresponding conditions, measuring two calibration targets with different spectral signatures to obtain actual measured values, dependent imaging and localisation behaviour of the optical system used, the measurement determining a difference between the actual measured values and predetermined known real distance values to obtain a correction value using the correction value to correct a shift brought about by the optical system in the detection of different emission loci.

2. The method of claim 1, wherein the measurement structures and calibration targets are investigated microscopically.

3. The method of claim 1, wherein the measurement structures and calibration targets are investigated at the same time.

4. The method according to claim 2, wherein the object is rotated axial-tomographically during the microscopic investigation.

5. The method according to claim 4, wherein the object carrier comprises a rotatable object support, and wherein the object is fixed in or on the rotatable object support, the object support being made of a material which is transparent for the light wavelengths used in the investigation, the material having a refraction index which differs at the most by 12 percent from that of a surrounding medium, the material having a cross section diameter which is less than or equal to 300 $\mu$m.

6. The method according to claim 5, wherein the object support is rotated through anangle $\phi_m$=360/3[○],$\phi_m$=360/4[○] or $\phi_m$=360/n[○], wherein n is the number of planar sides of the object support, and wherein a distance between the calibration targets and/or between measurement structures is measured for at least one spectral signature at at least one of said angles.

7. The method according to claim 4, wherein the steps of measuring and determining comprise marking, with a random spectral signature, one or more calibration targets B at a distance greater than the half-intensity width of the principle maximum of the actual point spread function from a barycentre of N measurement structures, measuring, via an automated image processing method, the distances $d_{ik}$(i, k=1 ... N, i≠k) of the barycentres of the spectrally separated diffraction figures of the N measurement structures and the distances $d_{iB}$ between the N measurement structures and the calibration target B;

measuring, for one measurement structure, each of the stretches $d_{ik}$ and $d_{iB}$ in the plane of the narrowest point spread function and all other distances, whereby the object is rotated axial-tomographically each time through a defined angle $\phi_m$, correcting optical aberrations from the calibration measurements and adapting a cosine function $A_{ik}\cos(\phi_m+\theta_{ik})$ or $A_{iB}\cos(\phi_m+\theta_{iB})$ with suitable phase dislocation to the corrected measured distances $d_{ik}(\phi_m)$ and $d_{iB}(\phi_m)$, dividing maxima $A_{ik}$ and $A_{iB}$ of the adaptation function of $d_{ik}$ or $d_{iB}$ by a multiplication factor and determining the maxima $A_{ik}$ and $A_{iB}$ as a Euclidean distance $D_{ik}$ or $D_{iB}$ between the N measurement structures or between the measurement structures and the calibration target B.

8. The method according to claim 7, further comprising analogically evaluating a relative minima of a distance $Z_{ik}$, $z_{iB}$ in a plane orthogonal to a plane of the distances $d_{ik}$, $d_{iB}$, and determining a maxima as a function of the the relative minima of the distance $z_{ik}$, $z_{iB}$ in the plane orthogonal to the plane of the distance $d_{ik}$, $d_{iB}$.

9. The method according to claim 7, further comprising using the 3D distances $D_{ik}$ or $D_{iB}$ in a system of equations $$D^2_{ik}=(x_k-x_i)^2+(y_k-y_i)^2+(z_k-z_i)^2$$
$$D^2_{iB}=(x_B-x_i)^2+(y_B-y_i)^2+(z_B-z_i)^2$$
$$D^2_{kb}=(x_B-x_k)^2+(y_B-y_k)^2+(z_B-z_k)^2$$

to calculate positions $x_i$, $y_i$, $z_i$ and $x_k$, $y_k$, $z_k$, as well as distances $x_k-x_i$, $y_k-y_i$, $z_{k-zi}$ and $x_B-x_i$, $y_B-y_i$, $z_{B-zi}$.

10. The method according to claim 7, further comprising determining co-ordinates and distances of the N measurement structures as a function of the barycentres, wherein the barycentres are determined from barycentre centerings of the measurements to all points of reference.

11. The method according to claim 7, further comprising convolving the positions received $x_i$, $y_i$, $z_i$ and $x_B$, $y_B$, $z_B$ with a point spread function with a half-intensity width, with the resolution equivalent achieved in each case and then represented graphically.

12. The method according claim 1, comprising marking the measurement structure(s) to be localised with fluorochromes with different spectral signatures and the same dynamic.

13. The method according to claim 1, wherein marked regions at a known distance from the object are used as calibration targets.

14. The method according to claim 1, wherein microspheres with identical or higher multispectral signatures than the measurement structures to be localised are used as the calibration targets.

15. The method according to claim 14, wherein the calibration targets are fixed on object supports in a defined spatial array.

16. The method according to claim 1, wherein said investigating step is performed using a laser scan flow fluorometer with a flow cytometer that includes a fluid stream flowing freely or in an optical cuvette with one or more laser beam sources whose laser beam(s) is/are focused on the central trajectory of the fluid stream, and with a detection system of detector(s), lens(es) and slit(s), wherein the laser beam(s) are focused in a ribbon like shape on the object trajectory.

17. The method according to claim 16, wherein the ribbon like shape of the laser beam(s) is generated by two or more intercrossing partial beams.

18. The method according to claim 17, wherein the lenses and slits in the detection beam path are selected and arrayed in such a way that only fluorescence emissions from the central interference fringe are depicted on the detector(s).

19. The method according to claims 16, wherein the detector(s) are divided into individual detection pixels and are suitable for spatial resolution of the fluorescence emission in both the flow direction and perpendicular to the flow direction.

20. The method according to claim 7, wherein the co-ordinates and distances of the N measurement structures are deduced on the basis of the barycentres, which are determined from barycentre centerings of the measurements to all points of reference.

21. A mount for an object support comprising a rigid, flattened frame with substantially a same length, width and height as conventional glass object slides according to DIN 58884, at least one bearing bush mounted on or against said frame, wherein one or more tubular or gutter-shaped object carriers can be placed in the frame so that said object carriers can be turned around their longitudinal axis with their rotation axis perpendicular to a microscope's optical axis, whereby the bearing brush(es) are mounted such that the rotation axis of the object carrier is perpendicular to the microscope's optical axis, and that at least one terminal section of the object carrier is accessible as a point of attachment for a torque force for rotating the object carrier.

22. The mount according to claim 21, wherein provision is made for a replaceable insert for the frame, which is suitable for partially or completely covering the recess in the frame.

23. The mount according to claim 22, wherein the replaceable insert is made of a material selected from the group consisting of plastic and glass.

24. The mount according to claim 22, wherein the insert has a grave-shaped excavation in the longitudinal direction of the object carrier.

25. The mount according to claim 21, wherein the object carrier is a microcapillary.

26. The mount according to claim 21, wherein the object carrier is glass fibre.

* * * * *